Reissued Mar. 5, 1935

Re. 19,487

UNITED STATES PATENT OFFICE 19,487

SOLUBLE POLYSULPHIDE AND ORGANIC COMPOUND REACTION PRODUCT AND PROCESS

Joseph C. Patrick, Trenton, N. J.

No Drawing. Original No. 1,962,460, dated June 12, 1934, Serial No. 627,470, August 4, 1932. Application for reissue June 27, 1934, Serial No. 732,740

24 Claims. (Cl. 260—6)

In prior applications, Serial Nos. 368,193 and 369,912 and Patent No. 1,890,191, I have described methods of manufacture and many of the valuable physical and chemical properties of the plastic substances which are the highly sulphurized products resulting from the interaction of soluble polysulphides with organic compounds containing terminal methylene or substituted methylene groups, one or more of which are linked to a negative radical or radicals. The term "methylene" in the claims is intended to include substituted methylene.

As examples may be cited the plastic products resulting from the interaction of water or alcohol soluble polysulphides, with methylene dihalide, ethylene dihalide, propylene dihalide, ethylene chlorhydrin, glyceryl trihalide, symmetrical dihalogen ethyl ether, dihalogen methyl ether, ethylene oxide, diethylene dioxide, formaldehyde, furfuraldehyde, and also some of the halogenated diolefines such as chlorisoprene, in the form of chlorinated rubber and also the vinyl acetylene derivative chloro-2-butadiene-1-3-, etc.

As usually prepared, the plastic substance is capable of a very considerable improvement in certain of its physical characteristics by increasing the amount of polymerization of it. In this way its tensile strength, resistance to tear, elasticity, resistance to effect of solvents, resistance to oxidation and other forms of chemical attack, are substantially increased, although the extent of elongation before break and the per cent. of permanent set after stress are thereby usually somewhat decreased.

A very convenient and practical method of preparing compounds or compositions containing the plastic substance is to break down the plastic on a rubber mill and then incorporate the various compounding ingredients such as metallic oxides, gas black, clays or other reinforcing or pigmenting materials together with any desired plasticizer, as, for example, natural or synthetic rubber, fatty acid soaps, etc.

The amount and nature of the compounding material or materials to be used with the plastic substance will vary depending upon the physical qualities required in the final product. The properly compounded mix is usually subjected to a suitable "hot cure", which may be defined generally as treatment at elevated temperatures, usually around 287° F., for a proper length of time, which is usually about 30 to 60 minutes for small objects or pieces.

In the investigation of methods by which the type of polymeric change believed to take place during the "hot cure" might be controlled and directed toward increased resistance to solvent attack without impairing softness and elasticity as is usual when polymerization is increased, certain substances of an acid character, or which are capable of developing an acidic character under the conditions of the "hot cure" and in the presence of the usual compounding ingredients, have been found to be particularly suitable.

Among the substances which have been found to be useful in producing the desired result, are many of the metallic halides, such as zinc chloride, aluminum chloride, stannous and ferrous chlorides as well as the bromides and fluorides of these metals, for example. Also certain of the organic halides are found to be of some value, such as aniline hydrochloride or hydrobromide, the chloro- or bromobenzenes and chloro- or bromonaphthalenes, especially hexachloronaphthalene and chloronitrobenzol, and the diphenylthalides, for example. It has also been found that many of the organic acids which are of suitable physical character to enable them to be compounded with the plastic substance, are suitable for promoting the desired type of polymerization. Among them may be mentioned salicyclic, benzoic and various sulphonic acids, particularly amino sulphonic acids, for example.

The best results have thus far been obtained by the use of varying quantities of the halogenated polyprenes, such as properly chlorinated or brominated rubber, and also the chlorine derivative of vinyl acetylene,

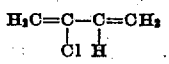

It is considered probable that the above mentioned halogen substituted isoprenes exert their beneficial effect principally as a result of their ability to permit traces of halogen acid to be split off and go either directly to the plastic substance or indirectly through the medium of the metallic oxide present. This conclusion has been drawn from the somewhat analogous results that have been obtained with the simple metallic halides, but I do not intend to confine myself to any particular theory as to what happens.

The effect is very unusuall in that while both chlorinated rubber and chloro-2-butadiene-1-3 are themselves highly soluble in chlorinated solvents and benzene, their properly prepared compounds with the plastic substance are extremely resistant to swelling in such solvents even when a very considerable percentage of chlorinated rubber or chloro-2-butadiene-1-3 is present. On the other hand, an equivalent amount of raw rubber mixed or compounded with the plastic substance behaves in a predictable manner, that is, the rate of attack by the solvent is roughly proportional to the increase in the rubber phase with compounds containing over about 10% of rubber.

The halogen bearing isoprenes compounded with the plastic substance also produce the advantage of very substantially decreasing the gas and odor of the plastic substance compounds around the mill and greatly improve the solidity of the cured sheet by suppressing the tendency toward porosity during the "hot cure".

Several examples will be given of satisfactory types of compounds made in accordance with this invention, solely by way of illustration of the principles outlined. For the purposes of illustration, a chlorinated rubber containing by analysis 15% by weight of chlorine, is described, as this type is the most easily prepared of any tried and gives very good results. The compound chloro-2-butadiene-1-3 is called chloroprene and is the chlorine derivative of vinyl acetylene. The plastic substance is the commercial article derived from ethylene. Zinc chloride will be given as illustrative of the effects of the metallic halides, although other metallic halides may be used. The parts are by weight.

*Example 1.*—100.0 parts of the highly sulphurized products resulting from the interaction of soluble polysulphides with organic compounds containing methylene or substituted methylene groups, one or more of which are linked to a negative radical or radicals, 10.0 parts zinc oxide, 5.0 parts rubber, 10.0 parts gas black, 0.5 part diphenylguanidine, 0.5 part sulphur, 2.0 parts zinc chloride and 0.5 part stearic acid were thoroughly mixed on a rubber mill and the compound was cured at 287° F. for 50 minutes. A test strip of this compound was treated with gasoline at 120° F. for a month and showed no measurable increase in length. It could be stretched 450% without rupture and caused no noticeable discoloration of the gasoline. The same results were obtained in benzene, except that there was a 1½% increase in elongation.

*Example 2.*—100.0 parts of the highly sulphurized products resulting from the interaction of soluble polysulphides with organic compounds containing methylene or substitute methylene groups, one or more of which are linked to a negative radical or radicals, 100.0 parts chloro-2-butadiene-1-3 (chlorovinyl acetylene), 5.0 parts rubber, 15.0 parts zinc oxide, 50.0 parts gas black and 1.0 part diphenylguanidine were mixed on the rubber mill and cured at 287° F. for 60 minutes. This compound showed only 7% increase in length of a test strip in benzene at 120° F. in a month, in spite of the relatively great amount of the rubber-like phase which was 105% of the highly sulphurized product. Both the rubber and the chloro-2-butadiene-1-3 are very rapidly attacked by hot benzene when the highly sulphurized product is not present.

*Example 3.*—100.0 parts of the highly sulphurized products resulting from the interaction of soluble polysulphides with organic compounds containing methylene or substituted methylene groups, one or more of which are linked to a negative radical or radicals, 25.0 parts chloro-2-butadiene-1-3 (chlorovinyl acetylene), 20.0 parts zinc oxide, 10.0 parts gas black, 0.5 part diphenylguanidine and 0.5 part stearic acid were compounded on the mill and cured at 287° F. for 50 minutes. This compound was flexible at −30° F., exhibited an elongation of only 3% in hot benzene (120° F.) in 5 days, and caused only a barely perceptible discoloration of the solvent.

*Example 4.*—100.0 parts of the highly sulphurized products resulting from the interaction of soluble polysulphides with organic compounds containing methylene or substituted methylene groups, one or more of which are linked to a negative radical or radicals, 10.0 parts chlcrinated rubber, 20.0 parts zinc oxide, 10.0 parts gas black, 0.5 part diphenylguanidine, 0.5 part sulphur and 0.5 part stearic acid were compounded on the mill and cured at 287° F. for 50 minutes. A dense, elastic sheet was formed of this compound which withstood a 450% elongation before it broke. It showed no measurable swell in hot gasoline (120° F.) in 10 days, showed only 4.8% elongation of the test strip in benzene under the same conditions. It did not exhibit "tenderness" and did not discolor either solvent.

A further characteristic of these types of compounds, some examples of which have been given above, is their unique resistance to attack by oxygen, either atmospheric (sun cracking) or in the activated form of ozone (electrical corona effect). All of them which have been tested have been found to be highly resistant to chemical attack, being unaffected by dilute acids and alkalies, and remaining substantially unaffected in the presence of concentrated acids with the exception of sulphuric and nitric. Hot concentrated caustic alkali solutions (above about 20% by weight equivalent of NaOH) slowly attack them.

Electrical tests indicate fairly high insulative values of over 300 volts per mil on the average.

The characteristics of the types of the plastic substance described in this application, i. e., high elasticity and extensibility, freedom from porosity, very unique resistance to organic solvents, unusual chemical stability and good electrical insulative properties fit them for many industrial applications, such as insulative sheathing for wires and cables exposed to severe conditions; hose linings where exposure to gasoline, benzene, paint and lacquer thinners are encountered; linings for tanks and pipe-lines as protection to the metal from chemical attack; solvent proof fabric, gaskets, etc.

I claim:

1. The process which comprises polymerizing the highly sulphurized products resulting from the interaction of soluble polysulphides with a compound of the formula $C_nH_{2n}X_2$, where $n$ is less than 5 and X is the equivalent of a monovalent negative radical, by the application of heat in the presence of a compound of the group consisting of aryl halides, halogenized rubber and chloro-2-butadiene-1-3.

2. The process which comprises polymerizing the highly sulphurized products resulting from the interaction of soluble polysulphides with a compound of the formula $C_nH_{2n}X_2$, where $n$ is less than 5 and X is the equivalent of a monovalent negative radical, by the application of heat in the presence of an aryl halide.

3. The process which comprises polymerizing the highly sulphurized products resulting from the interaction of soluble polysulphides with a compound of the formula $C_nH_{2n}X_2$, where $n$ is less than 5 and X is the equivalent of a monovalent negative radical, by the application of heat in the presence of halogenized rubber.

4. The process which comprises polymerizing the highly sulphurized products resulting from the interaction of soluble polysulphides with a compound of the formula $C_nH_{2n}X_2$, where $n$ is less than 5 and X is the equivalent of a monovalent negative radical, by the application of heat in the presence of chloro-2-butadiene-1-3.

5. The process which comprises polymerizing the highly sulphurized products resulting from the interaction of soluble polysulphides with ethyelene dichloride, by the application of heat in the presence of a compound of the group consisting of aryl halides, halogenized rubber and chloro-2-butadiene-1-3.

6. The process which comprises polymerizing the highly sulphurized products resulting from the interaction of soluble polysulphides with ethylene dichloride, by the application of heat in the presence of an aryl halide.

7. The process which comprises polymerizing the highly sulphurized products resulting from the interaction of soluble polysulphides with ethylene dichloride, by the application of heat in the presence of halogenized rubber.

8. The process which comprises polymerizing the highly sulphurized products resulting from the interaction of soluble polysulphides with ethylene dichloride, by the application of heat in the presence of chloro-2-butadiene-1-3.

9. A product comprising a compound of the group aryl halides, halogenized rubber and chloro-2-butadiene-1-3, and a polymerized highly sulphurized compound resulting from the interaction of soluble polysulphides with a compound of the formula $C_nH_{2n}X_2$ where $n$ is less than 5 and X is the equivalent of a mono-valent negative radical.

10. A product comprising an aryl halide and a polymerized highly sulphurized compound resulting from the interaction of soluble polysulphides with a compound of the formula $C_nH_{2n}X_2$ where $n$ is less than 5 and X is the equivalent of a mono-valent negative radical.

11. A product comprising halogenized rubber and a polymerized highly sulphurized compound resulting from the interaction of soluble polysulphides with a compound of the formula $C_nH_{2n}X_2$ where $n$ is less than 5 and X is the equivalent of a mono-valent negative radical.

12. A product comprising chloro-2-butadiene-1-3 and a polymerized highly sulphurized compound resulting from the interaction of soluble polysulphides with a compound of the formula $C_nH_{2n}X_2$ where $n$ is less than 5 and X is the equivalent of a mono-valent negative radical.

13. A product comprising a compound of the group aryl halides, halogenized rubber and chloro-2-butadiene-1-3, and a polymerized highly sulphurized compound resulting from the interaction of soluble polysulphides with ethylene dichloride.

14. A product comprising an aryl halide and a polymerized highly sulphurized compound resulting from the interaction of soluble polysulphides with ethyelene dichloride.

15. A product comprising halogenized rubber and a polymerized highly sulphurized compound resulting from the interaction of soluble polysulphides with ethylene dichloride.

16. A product comprising chloro-2-butadiene-1-3 and a polymerized highly sulphurized compound resulting from the interaction of soluble polysulphides with ethylene dichloride.

17. A composition comprising a compound of the group aryl halides, halogenized rubber and chloro-2-butadiene-1-3, and a highly sulphurized compound resulting from the interaction of soluble polysulphides with a compound of the formula $C_nH_{2n}X_2$ where $n$ is less than 5 and X is the equivalent of a mono-valent negative radical.

18. A composition comprising an aryl halide and a highly sulphurized compound resulting from the interaction of soluble polysulphides with a compound of the formula $C_nH_{2n}X_2$ where $n$ is less than 5 and X is the equivalent of a mono-valent negative radical.

19. A composition comprising halogenized rubber and a highly sulphurized compound resulting from the interaction of soluble polysulphides with a compound of the formula $C_nH_{2n}X_2$ where $n$ is less than 5 and X is the equivalent of a mono-valent negative radical.

20. A composition comprising chloro-2-butadiene-1-3 and a highly sulphurized compound resulting from the interaction of soluble polysulphides with a compound of the formula $C_nH_{2n}X_2$ where $n$ is less than 5 and X is the equivalent of a mono-valent negative radical.

21. A composition comprising a compound of the group aryl halides, halogenized rubber and chloro-2-butadiene-1-3, and a highly sulphurized compound resulting from the interaction of soluble polysulphides with ethylene dichloride.

22. A composition comprising an aryl halide and a highly sulphurized compound resulting from the interaction of soluble polysulphides with ethylene dichloride.

23. A composition comprising halogenized rubber and a highly sulphurized compound resulting from the interaction of soluble polysulphides with ethylene dichloride.

24. A composition comprising chloro-2-butadiene-1-3 and a highly sulphurized compound resulting from the interaction of soluble polysulphides with ethylene dichloride.

JOSEPH C. PATRICK.